United States Patent [19]
Cronan

[11] 3,714,448
[45] Jan. 30, 1973

[54] LIGHT WEIGHT, LOW TORQUE, INEXPENSIVE DRUM TYPE OPTICAL DIGITAL SHAFT ANGLE ENCODER

[75] Inventor: John J. Cronan, Fairfield, Conn.

[73] Assignee: United Aircraft Corporation, East Hartford, Conn.

[22] Filed: Dec. 10, 1971

[21] Appl. No.: 206,670

[52] U.S. Cl. .............................. 250/231 SE, 340/271
[51] Int. Cl. ................................................ G01d 5/36
[58] Field of Search..250/231, 231 SE, 219 DD, 233; 340/271

[56] References Cited

UNITED STATES PATENTS

| 3,524,067 | 8/1970 | West | 250/219 DD |
|---|---|---|---|
| 3,187,187 | 6/1965 | Wingate | 250/231 SE X |
| 3,546,470 | 12/1970 | Junkert et al. | 250/219 DD |
| 3,470,385 | 9/1969 | Emmerich | 250/219 DD X |
| 3,458,706 | 7/1969 | Ravenhall et al. | 250/219 DD |
| 3,500,343 | 3/1970 | Spieker | 250/219 DD X |

*Primary Examiner*—Walter Stolwein
*Attorney*—Melvin Pearson Williams

[57] ABSTRACT

A low cost, light weight drum type optical encoder for producing a digital manifestation of the position of a shaft, such as the indicator needle shaft of a gauge or a weighing scale, comprises a small light weight dish with a strip of material, such as plastic or metal having coded optical transmissivity or reflectivity thereon, held to the flanged rim of the dish by a shrunken ring retainer. Light passing through a slit is transmitted by or reflected from the code drum in a coded fashion to be sensed by appropriately disposed photodetectors, the signals from which are used in any digital fashion.

1 Claim, 3 Drawing Figures

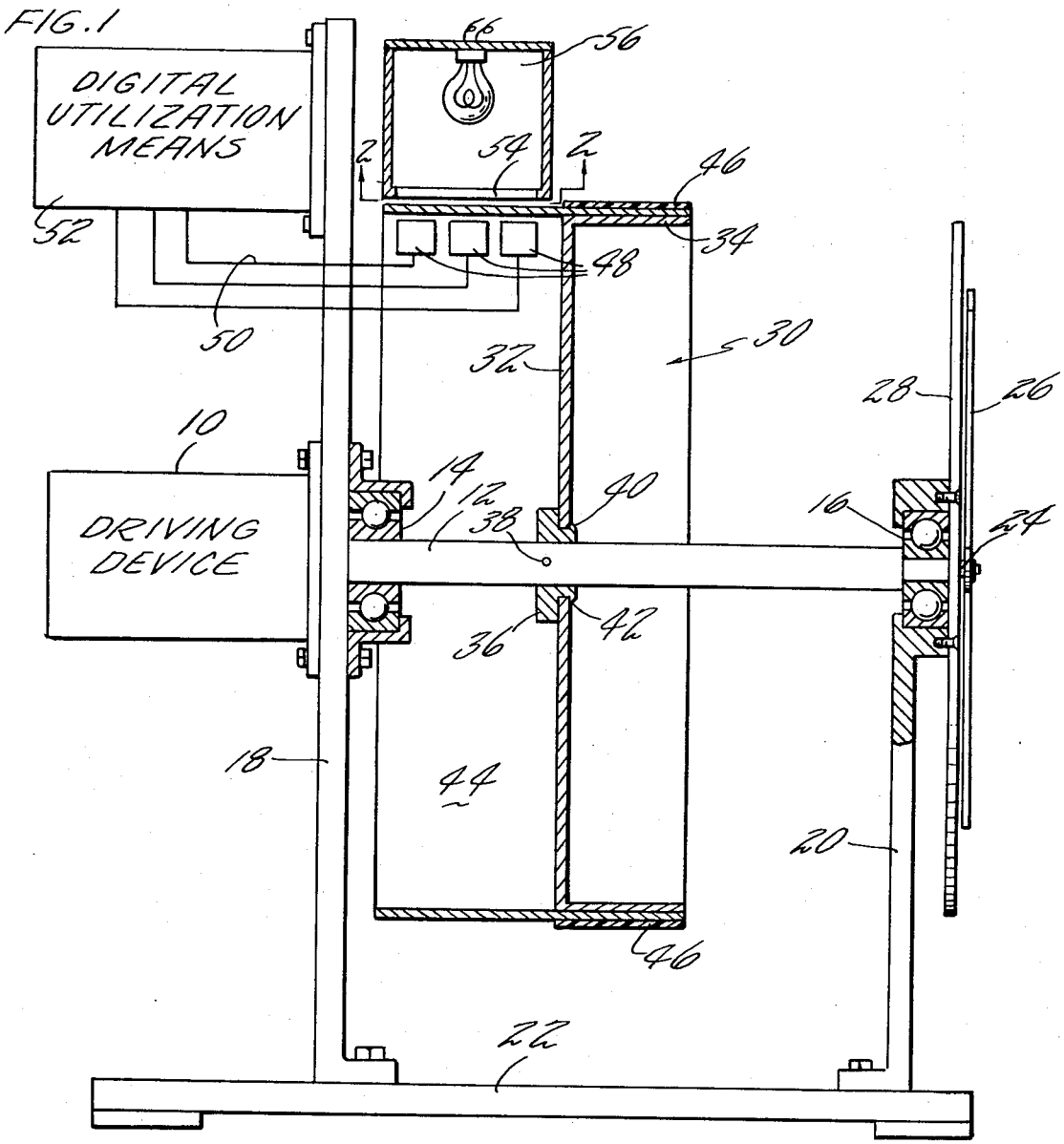
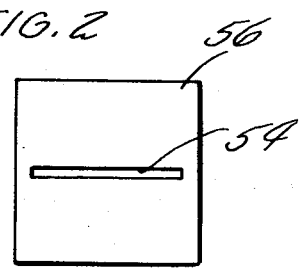
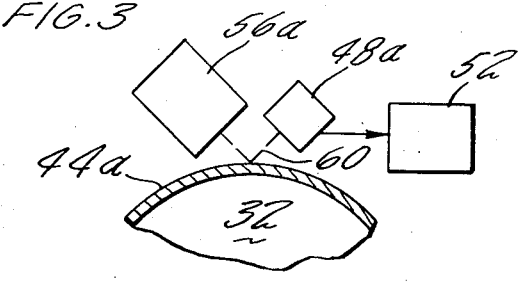

LIGHT WEIGHT, LOW TORQUE, INEXPENSIVE DRUM TYPE OPTICAL DIGITAL SHAFT ANGLE ENCODER

BACKGROUND OF THE INVENTION

1. Field of Invention

This invention relates to shaft angle encoders, and more particularly to a low cost, low torque, light weight, drum style optical encoder.

2. Description of the Prior Art

In the art, there are a plethora of shaft angle encoders for providing digital data relative to the angular position of a shaft. However, most of these are quite expensive, and can be driven only by shafts having a suitably high rotational torque loading capacity. In addition, the majority of optical encoders known to the art are of the disk type, so that the high order stages are mounted on inner tracks of a very low radius, and require extremely high manufacturing accuracy in order to ensure suitable resolution.

Devices such as low cost weighing scales, of the type which may be used in the prepackaged cutting rooms of supermarkets, are capable of adaptation to provide digital inputs to facilitate inventory and cost control. However, extensive modification is required in order to utilize encoders known to the art. Additionally, the cost of encoders known to the art capable of implementation in such a weighing scale is prohibitive relative to the established market for such scales. Further, retrofitting of existing scales is virtually impossible utilizing devices known to the art. Similar factors apply in dial gauges, such as the type commonly used to read pressure in various processes.

SUMMARY OF THE INVENTION

A primary object of the present invention is to provide a relatively inexpensive, low torque, reliable, lightweight digital shaft angle encoder.

According to the present invention, an optical shaft angle encoder comprises a drum consisting of a strip of suitable material having digitally coded optical properties. In further accord with the present invention, the plastic strip code drum is mounted to a dish-like disk having a peripheral flange by means such as a shrunken ring retainer.

In one embodiment of the invention, the strip is encoded with varying optical transmissivity, so that light passes radially therethrough in a coded fashion to selectively energize oppositely-disposed photo detectors; an opaque material, such as metal, may have a coded pattern of perforations therethrough; or a translucent or transparent material, such as a polyester or other plastic, may have an opaque code pattern disposed thereon.

In another embodiment, the strip is encoded in a reflective pattern and may comprise a reflective metal strip having a non-reflective pattern disposed thereon.

In still further accord with the present invention, the encoding drum can be simply mounted to substantially any existing shaft, the angle of which is desired to be digitally encoded.

The present invention facilitates retrofitting to provide digitally coded outputs from substantially any shaft, even shafts capable of supplying only a low angular torque. The invention may be implemented in a wide variety of forms, utilizing a wide variety of materials, at very low cost, and with mass production techniques. The device is capable of producing substantially accurate digitally encoded shaft angle information with a minimum of cost, torque and weight requirements.

Other objects, features and advantages of the present invention will become more apparent in the light of the following detailed description of a preferred embodiment, as illustrated in the accompanying drawing.

BRIEF DESCRIPTION OF THE DRAWING

FIG. 1 is a simplified, partially sectioned side elevation view of an exemplary embodiment of the invention;

FIG. 2 is a partial bottom view taken on the line 2—2 in FIG. 1, illustrating a light slit; and FIG. 3 is a simplified illustrative view of a reflective embodiment of the invention.

DESCRIPTION OF THE PREFERRED EMBODIMENT

In the first, exemplary embodiment of FIG. 1, a typical driving device 10 is shown schematically. This device may comprise the mechanism of a pressure gauge, a weighing scale, or any other device having shaft angle as an output indication of a parameter (such as weight or pressure) being measured. The driving device 10 drives a shaft 12 journaled in bearings 14, 16 which are suitably disposed on corresponding frame members 18, 20 secured to a base 22. Although shown, for simplicity of illustration, as ball bearings, the bearings 14, 16 may preferably comprise jewel bearings so as to provide minimum loading of the shaft 12. The distal end 24 of the shaft 12 is necked down to receive a needle pointer 26 of the type commonly used on gauges and scales. The frame 20 supports a dial plate 28 indexed with suitable indications of the parameter being measured, against which the needle 26 may be viewed, as is well known in the art.

The apparatus 10–28 described thus far is merely an exemplary environment to which the present invention appertains, and is illustrative of a wide variety of known measuring devices which convert a measured parameter to an angle of rotation of a shaft.

In accordance with the present invention, a dish-like member 30 comprises a disk portion 32 and a peripheral flange portion 34. The dish 30 may preferably comprise a light weight metal, such as aluminum, of a thin gauge, which may preferably be formed by an automated process, such as stamping. The dish 30 is secured to the shaft 12 by a hub assembly 36 which may be locked to the shaft by a pin 38 and staked to the dish 30 as at 40 and 42; or it may be secured in any other suitable manner.

The essential feature of the present invention is the code drum 44, which is a preferred embodiment may comprise a suitable translucent plastic material (such as material sold under the trade name Mylar) in strip form, formed into a closed loop, and sliped over the flanged portion 34 of the dish member 30. The code drum 44 is provided with an opaque pattern (not shown), by any suitable means such as printing or photographic processes, arranged in transverse rows in a manner to provide a distinct digital encoding of the relative respective position of each row about the code drum. The actual code utilized may be binary or BCD, but may preferably comprise a Gray code having the advantage that only one bit changes at a time. Any other code, suitable to a given utilization of an embodiment of the present invention, may be chosen in accordance with the teachings of the prior art.

The code drum 44 is secured to the dish member 30 by a shrunken ring retainer 46, which may comprise a heat shrinkable fluorocarbon or polyurethane plastic, which can shrink a requisite amount with a relatively small amount of heat applied thereto, or any other form of shrunken ring which may be applied compatibly with the temperature limits of the code drum. The strip 44 may have one end fixed and the other end under tension as the retainer 46 is applied. Alternatively, the strip could be formed into an endless belt prior to being disposed on the member 30, if desired.

The dish-like member 30 is shown opening toward the right as seen in FIG. 1, with the code drum 44 extending to the left as seen in FIG. 1; this provides maximum stability for the drum 44 as it rotates. Of course, the orientation of the member 30 may be reversed if desired without impairing the operation of the invention in suitable embodiments; such an alteration may assist in providing further compactness in certain utilizations of the invention.

Digital read out of the code drum is effected by a plurality of photo detectors 48, which are connected by suitable electrical connections 50 to any appropriate sort of digital utilization means 52. The photo detectors 48 are energized by light in the embodiment of FIG. 1, passing through a slit 54 in a light source 56, which may be of any suitable type known to the art. The slit 54 is shown more clearly in FIG. 2.

In a variation of the embodiment illustrated in FIG. 1, the code drum 44 may comprise a strip of relatively opaque material, such as thin, light weight metal, having a pattern of transmissivity, such as perforations or holes, provided therein. In both variations of this embodiment of the invention, the need for a high degree of accuracy in manufacturing is eliminated since the drum need not be perfectly round (as viewed, say, from the left of FIG. 1) since the encoding light passes through the drum radially.

The embodiment of the invention just described illustrates the basic features of this invention. First, the code drum 44 comprises only a strip of material having an optical pattern thereon to provide digital optical signals indicative of its relative angular position. In the preferred embodiment, the drum 44 need comprise no more than a strip of plastic material having an opaque pattern and formed into a closed loop. The drum 44 is readily supported on any shaft (the angle of which is to be encoded) by simple means such as a flanged disk 30, to which the code drum 44 is easily attached by a shrunken ring retainer 46. The invention may be embodied in a variety of sizes (such as diameters ranging from 1 inch to 6 inches) and various materials may be selected for use therein. The construction, and the adaptation to a variety of shafts, are further simplified by utilization of the drum type structure in accordance with the invention.

It should be apparent that the low torque requirements of this device stem from the use of a minimal amount of material. Thus, the code drum facilitate optical encoding with a low rotational moment of inertia, thus providing substantially no drag on the shaft 12. The actual power requirements for the device are not more than that determined by the bearings 14, 16; assuming that suitable jeweled bearings are utilized, the power requirements approach zero.

Referring now to FIG. 3, an alternative embodiment of the invention, which however, incorporates the important features of the invention described with respect to the embodiment of FIGS. 1 and 2 hereinbefore, may employ a code drum 44a in which the optical encoding is in the nature of reflective encoding rather than transmissive encoding, as is known to the art. In such a case, both the light source 56a and the photo detectors 48a would be mounted on the same side of the code drum 44, either on the outside as illustrated in FIG. 3, or on the inside if desirable in any implementation of the present invention. The photo cells 48a would cause response in the digital utilization means 52 in the same fashion as in the embodiment of FIG. 1.

The number of photo detectors 48 is of course related to the size and nature of the code used. This, naturally, may be varied to suit any implementation of the present invention. Similarly, the optical arrangement may be more sophisticated: the light source may be collimated by a reflector or focused by suitable lenses, and other variations may be made in accordance with the skill of the art. Similarly, although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of my invention, that which I claim as new and desire to secure by Letters Patent of the United States is:

1. An optical digital shaft angle encoder adapted for connection to a rotatable shaft, the angular position of which is to be digitally encoded by said encoder, comprising:

a dish-like member comprising a peripherally flanged disk, said member secured to a shaft, the rotational angle of which is to be encoded;

a code drum comprising a thin strip of material formed into a closed loop and having a pattern of optical properties in rows transverse to the length of said strip, said pattern providing digital representations of angular positions of said rows about said drum, said drum disposed in intimate contact with the peripheral flange of said dish-like member and extending axially outward therefrom;

a shrink ring retainer disposed on the outside of said closed loop strip radially opposite to said peripheral flange and retaining said strip on said peripheral flange;

optical detection means including a light source and a plurality of light responsive means, said source and said light responsive means disposed in proximity with said drum and aligned with one another and arranged so that light from said source will energize said light responsive means selectively in accordance with said code pattern; and digital utilization means responsive to said photo responsive means for receiving electrical signals digitally representing the position of said drum.

* * * * *